United States Patent [19]

Marth

[11] Patent Number: 4,835,434
[45] Date of Patent: May 30, 1989

[54] PIEZOELECTRIC POSITIONING ELEMENT

[75] Inventor: Harry Marth, Waldbronn, Fed. Rep. of Germany

[73] Assignee: Physik Instrumente (PI) GmbH Produktions & Marketing KG, Waldbronn, Fed. Rep. of Germany

[21] Appl. No.: 97,886

[22] Filed: Sep. 17, 1987

[30] Foreign Application Priority Data

Sep. 27, 1986 [DE] Fed. Rep. of Germany ....... 3632964

[51] Int. Cl.⁴ ............................................ H01L 41/08
[52] U.S. Cl. ..................................... 310/328; 33/833; 33/501.5
[58] Field of Search ............. 310/323, 328; 33/125 R, 33/166, 172 E

[56] References Cited

U.S. PATENT DOCUMENTS

| | | | |
|---|---|---|---|
| 3,473,466 | 10/1969 | Thayer | 310/328 X |
| 3,611,577 | 10/1971 | Smith | 310/328 X |
| 3,720,849 | 3/1973 | Bardocz | 310/328 |
| 4,583,135 | 4/1986 | Kimura | 310/328 X |
| 4,607,166 | 8/1986 | Tamaki | 310/328 X |

FOREIGN PATENT DOCUMENTS 0195479 4/1986 European Pat. Off. .

Primary Examiner—Mark O. Budd
Attorney, Agent, or Firm—Edwin E. Greigg

[57] ABSTRACT

The invention relates to a piezoelectric positioning element having a micrometer screw, which is combined with a piezotranslator via an intermediate part that is adjustable in length. The stationary portion and the piezoelectrically adjustable portion of the intermediate part are joined to one another by means of a parallel spring guide. The translator may also be made of an electrostrictive or magnetostrictive material.

20 Claims, 2 Drawing Sheets

PIEZOELECTRIC POSITIONING ELEMENT

BACKGROUND OF THE INVENTION

The invention is based on a piezoelectric positioning element, comprising a micrometer screw and a piezotranslator combined with it, the change in length of which, resulting from the application of voltage, causes a corresponding change in length at the spindle of the micrometer screw.

piezoelectric positioning elements of this type have already been disclosed by the present applicant. They are used wherever manual adjustment over several millimeters is to be done at the same time as an electrical control of position in the micrometer range. The coarse adjustment is accordingly done by the micrometer crew, while the fine adjustment is accomplished by the piezotranslator. These positioning elements have proved to be excellent for fine adjustment of mirrors, for mask positioning in the semiconductor industry, for positioning optical fibers, and in many other kinds of application, wherever the critical factor is not to measure the absolute position of a component but rather to position or adjust it highly accurately.

In previously known piezoelectric positioning elements, the piezotranslator has either been mounted on the front end of the measuring spindle, or has been kept small enough to be built into the spindle of the micrometer screw. In both cases, however, special micrometer screws must be used, having a non-rotating spindle. These screws are relatively large, and because of the special manufacture of the non-rotating spindle they are also considerably more expensive than the micrometer screws usually used.

OBJECT AND SUMMARY OF THE INVENTION

Based on the above, it is the object of the present invention to improve the above-described piezoelectric positioning element such that standard micrometer screws can be used, and at the same time it is easier to mount the positioning element at the site of adjustment. Finally, the positioning element according to the invention should be distinguished by a compact structure.

This object is attained in accordance with the invention in that the piezotranslator is built into an intermediate part, the portion of which that is associated with one end of the piezotranslator being joined to the housing of the micrometer screw, and the portion of which that is associated with the other end of the piezotranslator being embodied as a mounting foot for securing the positioning element; these two portions of the intermediate part are joined to one another by means of a straight-line guide, at least approximately in the measurement direction of the micrometer screw.

Accordingly, the invention comprises securing the housing of the micrometer screw to an intermediate part of "variable" length, which in turn has a mounting foot, the effective length of the intermediate part being adjustable by means of the built-in piezotranslator. Fine adjustment of the pickup point of the micrometer screw is thereby possible.

As a result, there is the advantage that the more-economical conventional micrometer screws having a rotating spindle can be used, and the entire positioning element can be mounted very simply at the desired point for it to be set up. Since it is no longer necessary to adapt the spindle diameter to the size of the piezotranslator, micrometer screws of the most varied sizes can be used.

In a further feature of the invention, it is recommended that the straight-line guide be embodied as a parallel spring guide comprising two spring bars extending approximately perpendicular to the measurement direction. This produces an absolutely play-free connection between the stationary portion and the piezoelectrically adjustable portion of the intermediate part.

This presents the advantageous opportunity to amplify the changes in length, which are in the micrometer range, of the piezoelectric element by means of an internal translation inside the parallel guide to substantially longer reciprocating movements at the housing of the micrometer screw. To this end, the piezotranslator is built in such a way that it engages approximately the middle portion of the spring bar associated with it, or even the portion of the spring near the mounting foot. The farther toward the mounting foot its point of engagement is shifted, the greater the deflection at the other end of the spring bars that are joined to the housing of the micrometer screw will be.

To preclude canting during the piezoelectrically generated adjustment, it is recommended that a solid intermediate part be used and that the parallel guide, i.e., the spring bars, be embodied by making transverse slits on the intermediate part; such slits can be made with great precision by spark erosion.

The piezotranslator itself is suitably built into a bore in the intermediate part that extends parallel to the measurement direction, or in other words is integrated directly with the intermediate part.

It is within the scope of the invention to use an electrostrictive or magnetostrictive element, instead of the piezotranslator described above. These elements also effect defined changes in length when a voltage is applied.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
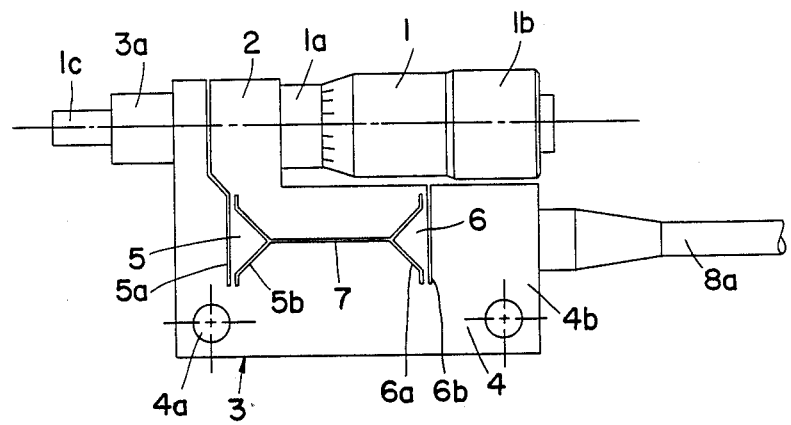
FIG. 1 is a side view of the positioning element according to the invention.

The piezoelectric positioning element comprises a micrometer screw 1, the housing 1a of which (also called a shaft) is firmly anchored in the adjustable portion 2 of an intermediate part 3.

The micrometer screw 1 is of conventional structure, namely having a rotatable measuring drum 1b, the rotation of which axially adjusts the spindle 1c.

The intermediate part 3 comprises the aforementioned adjustable portion 2, which supports the micrometer screw 1, and a portion 4 that is elastically adjustable relative to the portion 2 and functions as a mounting foot. To this end, it is provided with attachment bores 4a and/or with a cylindrical shaft 3a, so that the complete positioning element can easily be mounted in the vicinity of the component that is to be positioned. It is particularly favorable to mount the element via the shaft 3a, which is disposed in the axial extension of the housing 1a of the micrometer screw and is traversed by its spindle 1c, because then the positioning element can be mounted in the same bore in which previously the mounting shaft of a conventional micrometer screw was secured.

The two portions 2 and 4 of the intermediate part 3 are elastically joined to one another by spring bars 5 and 6. These spring bars extend perpendicular to the measurement direction and are produced by means of slits 5a, 5b and 6a, 6b traversing the intermediate part. Thus, in combination with the horizontal slit 7 extending from slit 5b to slit 6a, a play-free parallel guide between the portions 2 and 4 is produced.

Figure 2:
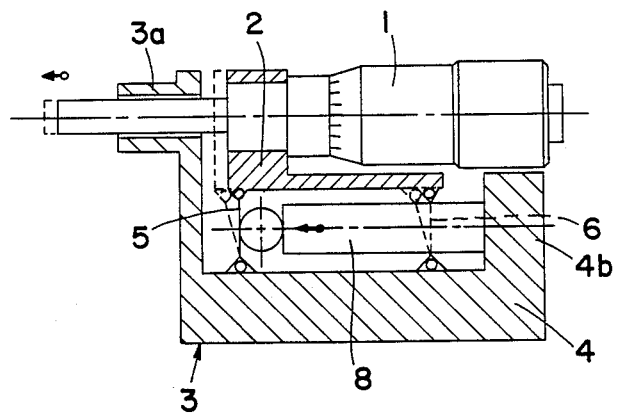
FIG. 2 is a function diagram for the same positioning element.

The function of this parallel guide is illustrated by FIG. 2. Here the two spring bars 5 and 6 are shown in the form of arms pivotably attached to the portions 2 and 4, and the known principle of parallelogram guidance is apparent.

The fact that this parallelogram guidance results in an arcuate motion of the portion 2 relative to the portion 4 has no significance here, because given the adjustment paths, in the micrometer range, between the two portions, the transverse component of the displacement motion is negligible.

FIG. 2 also shows the piezotranslator 8, which was left out of FIG. 1 for the sake of simplicity. It is built into the intermediate part 3 parallel to the micrometer screw, in such a way that with one end it rests on a vertically upright leg 4b of the portion4 and with its other end rests on the spring bar 5. If it is subjected to a predetermined voltage via the connection line 8a, so that it expands, the result is the desired fine adjustment of the portion 2 hearing the micrometer screw.

For amplification of the short positioning paths of the piezotranslator 8, it engages the spring bar 5 in approximately its middle portion, or lower. The result is at least a doubling of the adjustment path of the micrometer screw relative to the change in length of the piezotranslator.

Figure 3:
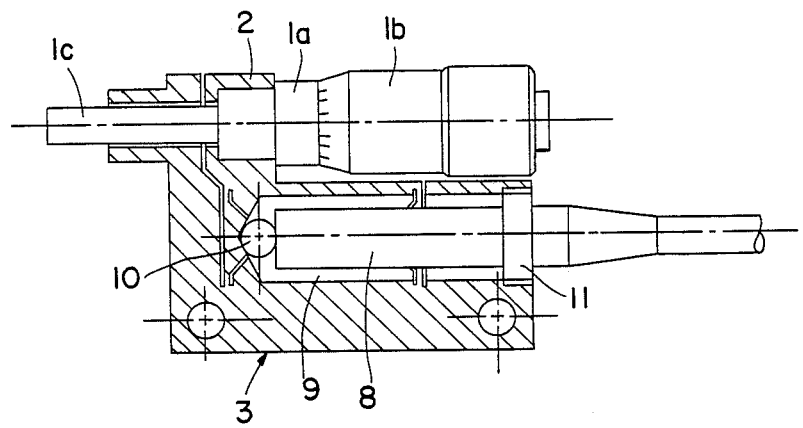
FIG. 3 is a longitudinal section taken through the positioning element.

FIG. 3 shows how the piezotranslator is installed in a longitudinal bore 9 of the intermediate part 3. As the drawing shows, the piezotranslator engages the spring bar 5 via a ball 10, while at its other end it is braced via a closure screw 11 on the aforementioned leg 4b of the portion 4.

Figure 4:
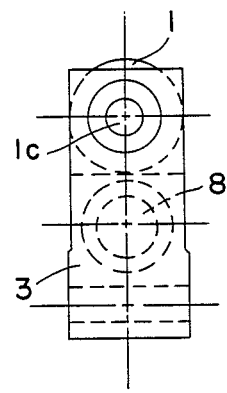
FIG. 4 is a front view looking toward the measuring spindle.

As FIG. 4 shows, the piezotranslator is fully integrated with the intermediate part 3 and is thereby protected on all sides. It can be produced in stacks, strips, or small tubes or by multilayering techniques. Equally suitably, the translator may be made of an electrostrictive or magnetostrictive material.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A piezoelectric positioning element, comprising a micrometer screw and a piezotranslator connected thereto, the change in length of the piezotranslator results from application of a voltage causing a corresponding change in position at a spindle of the micrometer screw, in which said piezotranslator (8) is disposed in an intermediate part (3), a first portion (2) of said intermediate part is associated with one end of the piezotranslator (8) and is joined to the housing (1a) of the micrometer screw (1) and a second portion 94) of said intermediate part is associated with the other end of the piezotranslator (8) and is embodied as a mounting foot for securing the positioning element, further wherein said first and second portions (2, 4) of the intermediate part (3) are joined to one another by means of straight-line guides (5, 6) extending approximately perpendicular to the measurement direction of the micrometer screw (1), and said piezotranslator (8) engages one of said guides.

2. A positioning element as defined by claim 1, in which the straight-line guides (5, 6) are embodied as parallel spring guides.

3. A positioning element as defined by claim 1, in which the straight-line guides include two spring bars (5, 6) extending approximately perpendicular to the measurement direction.

4. A positioning element as defined by claim 2, in which the straight-line guide include two spring bars (5, 6) extending approximately perpendicular to the measurement direction.

5. A positioning element as defined by claim 2, in which the piezotranslator (8) engages a middle portion of one spring guide (5).

6. A positioning element as defined by claim 3, in which the piezotranslator (8) engages a middle portion of one spring guide (5).

7. A positioning element as defined by claim 4, in which the piezotranslator (8) engages a middle portion of one spring guide (5).

8. A positioning element as defined by claim 2, in which the piezotranslator (8) engages one of said spring guides near a mounting foot (4).

9. A positioning element as defined by claim 3, in which the piezotranslator (8) engages one of said spring guides near a mounting foot (4).

10. A positioning element as defiend by claim 4, in which the piezotranslator (8) engages one of said spring guides portion near a mounting foot (4).

11. A positioning element as defined by claim 1, in which the intermediate part (3) is solid, and the guides (5, 6) are embodied by means of eroded slits (5a, 5b, 6a, 6b and 7).

12. A positioning element as defined by claim 2, in which the intermediate part (3) is solid, and the spring guides (5, 6) are embodied by means of eroded slits (5a, 5b, 6a, 6b and 7).

13. A positioning element as defined by claim 3, in

14. A positioning element as defined by claim 4, in which the intermediate part (3) is solid, and the guides (5, 6) are embodied by means of eroded slits (5a, 5b, 6a, 6b and 7).

15. A positioning element as defined by claim 5, in which the intermediate part (3) is solid, and the guides (5, 6) are embodied by means of eroded slits (5a, 5b, 6a, 6b and 7).

16. A positioning element as defined by claim 6, in which the intermediate part 93) is solid, and the guides (5, 6) are embodied by means of eroded slits (5a, 5b, 6a, 6b and 7).

17. A positioning element as defined by claim 1, in which the second portion (4) of the intermediate part (3) associated with the aforementioned other end of the piezotranslator (8) acts as a mounting foot and is provided with a shaft (3a), which forms an axial extension of a mounting shaft of the micrometer screw.

18. A positioning element as defined by claim 1, in which the piezotranslator (8) is positioned in a bore (9) disposed in the intermediate part (3) so as to extend parallel to a measurement direction of the micrometer screw.

19. A positioning element as defined by claim 1, in which an electrostrictive element is positioned in a bore disposed in the intermediate part (3) so as to extend parallel to a measurement direction of the micrometer screw.

20. A positioning element as defined by claim 1, in which a magnetostrictive element is positioned in a bore disposed in the intermediate part (3) so as to extend parallel to a measurement direction of the micrometer screw.

* * * * *

UNITED STATES PATENT AND TRADEMARK OFFICE
CERTIFICATE OF CORRECTION

PATENT NO.   : 4,835,434
DATED        : May 30, 1989
INVENTOR(S)  : Harry Marth

It is certified that error appears in the above-identified patent and that said Letters Patent is hereby corrected as shown below:

Column 1, line 11, change "piezoelectric" to

-- Piezoelectric --.

Column 3, line 38, change "hearing" to -- bearing --.

Column 4, line 5, change "94" to -- (4 --.

Signed and Sealed this

Eighth Day of May, 1990.

Attest:

HARRY F. MANBECK, JR.

*Attesting Officer*   *Commissioner of Patents and Trademarks*